(12) United States Patent
Brennan

(10) Patent No.: US 12,268,655 B1
(45) Date of Patent: *Apr. 8, 2025

(54) LIQUID DOSING MEDICATION DISPENSER

(71) Applicant: Edward Brennan, Bridgeport, WV (US)

(72) Inventor: Edward Brennan, Bridgeport, WV (US)

( * ) Notice: Subject to any disclaimer, the term of this patent is extended or adjusted under 35 U.S.C. 154(b) by 1013 days.

This patent is subject to a terminal disclaimer.

(21) Appl. No.: 17/246,620

(22) Filed: May 1, 2021

Related U.S. Application Data

(63) Continuation-in-part of application No. 15/950,095, filed on Apr. 10, 2018, now Pat. No. 11,071,691.

(51) Int. Cl.
*A61J 7/00* (2006.01)
*A61J 7/04* (2006.01)
*G01F 23/02* (2006.01)

(52) U.S. Cl.
CPC ............... *A61J 7/0084* (2013.01); *A61J 7/04* (2013.01); *G01F 23/02* (2013.01)

(58) Field of Classification Search
CPC .... A61J 7/04; A61J 7/0092; A61J 7/02; A61J 7/0409; A61J 7/0427; A61J 7/0436; A61J 7/0454; A61J 7/0463; A61J 7/0481; A61J 7/0015; A61J 7/0046; A61J 7/0069; A61J 7/0076; A61J 7/0084
See application file for complete search history.

(56) References Cited

U.S. PATENT DOCUMENTS

| | | | | |
|---|---|---|---|---|
| 3,638,603 A | * | 2/1972 | Conover | A61J 7/04 206/1.5 |
| 4,164,301 A | * | 8/1979 | Thayer | B65D 83/0454 292/84 |
| 4,261,468 A | * | 4/1981 | Krebs | B65D 83/0454 220/525 |
| 4,793,492 A | * | 12/1988 | Halbich | A61J 7/0084 206/538 |
| 5,558,229 A | * | 9/1996 | Halbich | A61J 7/04 206/499 |
| 5,823,346 A | * | 10/1998 | Weiner | A61J 7/04 206/459.1 |
| 5,852,590 A | * | 12/1998 | de la Huerga | G06K 19/07762 368/10 |
| 6,169,707 B1 | * | 1/2001 | Newland | G09B 19/00 368/10 |

(Continued)

*Primary Examiner* — Philip R Wiest

(74) *Attorney, Agent, or Firm* — Gugliotta & Gugliotta LPA

(57) ABSTRACT

A liquid medication storage, dispensing and tracking apparatus is provided having an octagonal housing forming seven separable individual containment compartments. Each compartment is adapted to be filled with a liquid medication dosage for subsequent dispensing. An eighth reminder compartment us provided having a form factor similar in shape and including a visual reminder indicia adapted to provide a reminder to refill liquid medication doses. The seven containment compartments and one reminder compartment are removably connected to allow for cleaning and refilling/reuse. The labeled liquid medication dispenser pre-measures dosages, tracks the status of a medication regime and serves as a reminder as to the date and time of a next dose.

10 Claims, 4 Drawing Sheets

(56) References Cited

U.S. PATENT DOCUMENTS

| | | | | |
|---|---|---|---|---|
| 6,252,494 B1 * | 6/2001 | Howell | | G01F 19/00 |
| | | | | 340/309.3 |
| D451,666 S * | 12/2001 | Zastrow | | D3/203.3 |
| 7,147,127 B2 * | 12/2006 | Lepke | | B65D 83/0454 |
| | | | | 221/83 |
| D563,095 S * | 3/2008 | Sabbag | | D3/203.3 |
| 8,193,918 B1 * | 6/2012 | Shavelsky | | A61J 7/0084 |
| | | | | 700/242 |
| 9,579,264 B1 * | 2/2017 | Litton | | A61J 7/0481 |
| 9,962,318 B1 * | 5/2018 | Miceli | | A61J 7/0084 |
| 9,980,881 B1 * | 5/2018 | Miceli | | A61J 7/0436 |
| D855,971 S * | 8/2019 | Moskowitz | | A61J 7/04 |
| | | | | D3/203.1 |
| 10,420,703 B1 * | 9/2019 | Lee | | A61J 1/03 |
| D901,166 S * | 11/2020 | Schepley | | D3/203.3 |
| 11,071,691 B1 * | 7/2021 | Brennan | | A61J 7/04 |
| 2002/0147526 A1 * | 10/2002 | Siegel | | G16H 40/67 |
| | | | | 700/241 |
| 2004/0182873 A1 * | 9/2004 | Baum | | G07F 11/44 |
| | | | | 221/76 |
| 2005/0051449 A1 * | 3/2005 | Jeter | | A47G 19/2272 |
| | | | | 206/459.1 |
| 2007/0093932 A1 * | 4/2007 | Abdulhay | | A61J 7/0084 |
| | | | | 700/231 |
| 2007/0138048 A1 * | 6/2007 | Coe | | A61J 7/04 |
| | | | | 206/528 |
| 2008/0237177 A1 * | 10/2008 | Robinson | | A61J 1/03 |
| | | | | 215/230 |
| 2009/0108016 A1 * | 4/2009 | Brown | | G07F 11/62 |
| | | | | 700/237 |
| 2010/0145297 A1 * | 6/2010 | Aguilo-Pinedo | | A61J 7/0046 |
| | | | | 604/404 |
| 2010/0314282 A1 * | 12/2010 | Bowers | | A61J 7/04 |
| | | | | 340/815.4 |
| 2014/0166529 A1 * | 6/2014 | Fung | | A61J 7/04 |
| | | | | 206/534 |
| 2017/0079422 A1 * | 3/2017 | Patel | | A46B 5/0095 |
| 2017/0128325 A1 * | 5/2017 | Riedel | | B65D 85/62 |
| 2017/0231867 A1 * | 8/2017 | Maston | | B65D 1/04 |
| | | | | 206/534 |
| 2018/0071172 A1 * | 3/2018 | Brown | | A61J 7/0436 |
| 2018/0098621 A1 * | 4/2018 | Patel | | A61J 7/04 |
| 2019/0133886 A1 * | 5/2019 | Brecht | | B65D 83/04 |
| 2019/0336399 A1 * | 11/2019 | Zonana | | A61J 1/03 |
| 2020/0008547 A1 * | 1/2020 | Hotop | | B65D 43/16 |
| 2020/0107994 A1 * | 4/2020 | Bernfeld | | A45C 3/06 |

* cited by examiner

LIQUID DOSING MEDICATION DISPENSER

RELATED APPLICATIONS

The present invention is a Continuation of U.S. Ser. No. 15/980,095, filed on Apr. 10, 2018 and incorporated by reference as if fully rewritten herein.

BACKGROUND OF THE INVENTION

1. Field of the Invention

The present invention relates generally to a medication dispenser and, more particularly, to a liquid medication dosing, tracking and dispensing system.

2. Description of the Related Art

Most medications dispensed for chronic conditions are prescribed at a set dose for regular intervals of time. Failure to maintain time intervals or dosages may result in incorrect blood serum levels of the medication and can adversely affect the medication's performance or lead to an unfavorable clinical outcome.

Many reason can exist for interruption with a medication regimen. Various cognitive impairments, ranging from lack of sleep or effects of medication, through dementia or age or disease related effects, will often have a negative impact on a user's maintenance of a medication regime. Additionally, patients who must take numerous medications on a regular basis can easily lose track of the time at which a particular medication was most recently taken, resulting in omission by the patient of required dosages or exceeding the dosage requirement. Frequently, the timing requirements vary for dosages of different medications and further lead to patient confusion and error in taking the different medications at correct time intervals. For these and other reason, many devices and systems exist that are intended to assist users in segregating and tracking medication doses and providing reminders for maintaining time intervals. However, such systems are generally directed for use with pills or capsules and not with liquid medications.

However, liquid medication dosages are often taken by patients. Typically such liquids are typically measured by pouring the medication into a teaspoon or small container prior to taking the medication. This manner of dosage measurement is prone to inaccuracy and can result in spills during measurement. Further, the amount of liquid medication remaining in a container cannot be easily determined. Unlike with pills or capsules where a patient or caregiver can count the number of pills present, liquid medications are far more problematic to routinely and accurately measure, dispense and track.

Consequently, a need exists for devices, systems and methods that are particularly adapted for the storing, measuring, dispensing and tracking of liquid medications.

SUMMARY OF THE INVENTION

It is thus an object of the present invention to provide a medication dosing, tracking and dispensing system.

It is a feature of the present invention to provide such a system specifically adapted for use with liquid medications.

Briefly described according to the preferred embodiment of the present invention, a liquid medication storage, dispensing and tracking apparatus is provided having an octagonal housing forming seven separable individual containment compartments. Each compartment is adapted to be filled with a liquid medication dosage for subsequent dispensing. An eighth reminder compartment us provided having a form factor similar in shape and including a visual reminder indicia adapted to provide a reminder to refill liquid medication doses. The seven containment compartments and one reminder compartment are removably connected to allow for cleaning and refilling/reuse. The labeled liquid medication dispenser pre-measures dosages, tracks the status of a medication regime and serves as a reminder as to the date and time of a next dose.

It is an advantage of the present invention to organize liquid medications in a manner that can aid patients, their families or caregivers to monitor medications throughout various times within the medication schedule.

It is another advantage of the present invention to allow for liquid medications to be pre-dispensed for storage or transport.

It is yet another advantage of the present invention to provide a medication dispenser with day and/or time of day reminder for dispensing liquids.

Further, the present invention may be adapted for use with over the counter liquid supplements, liquid vitamins, and non-prescription liquid medications to ensure proper dosing and ease remembering of the time of dosing.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
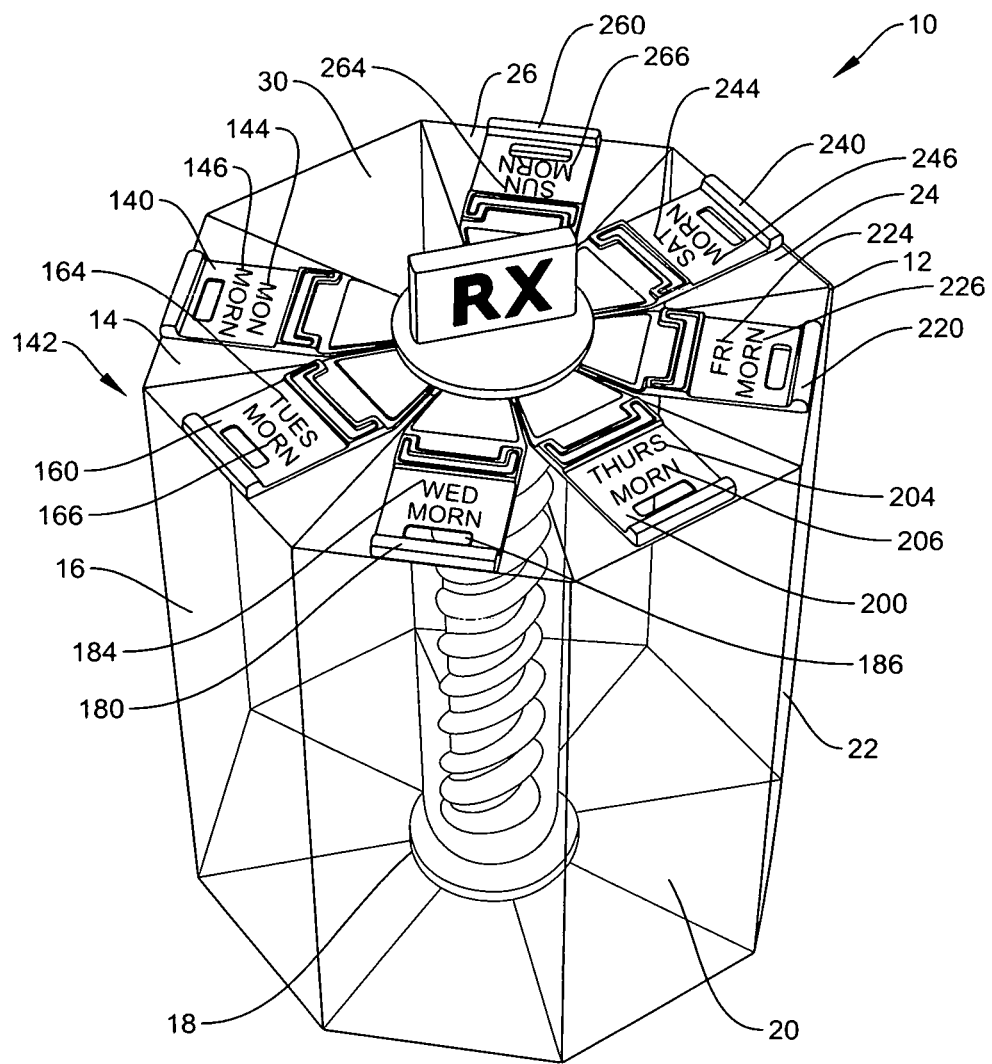
FIG. 1 is a front perspective view of a liquid medication storage, dispensing and tracking apparatus for use with the preferred embodiment of the present invention.
Figure 2:
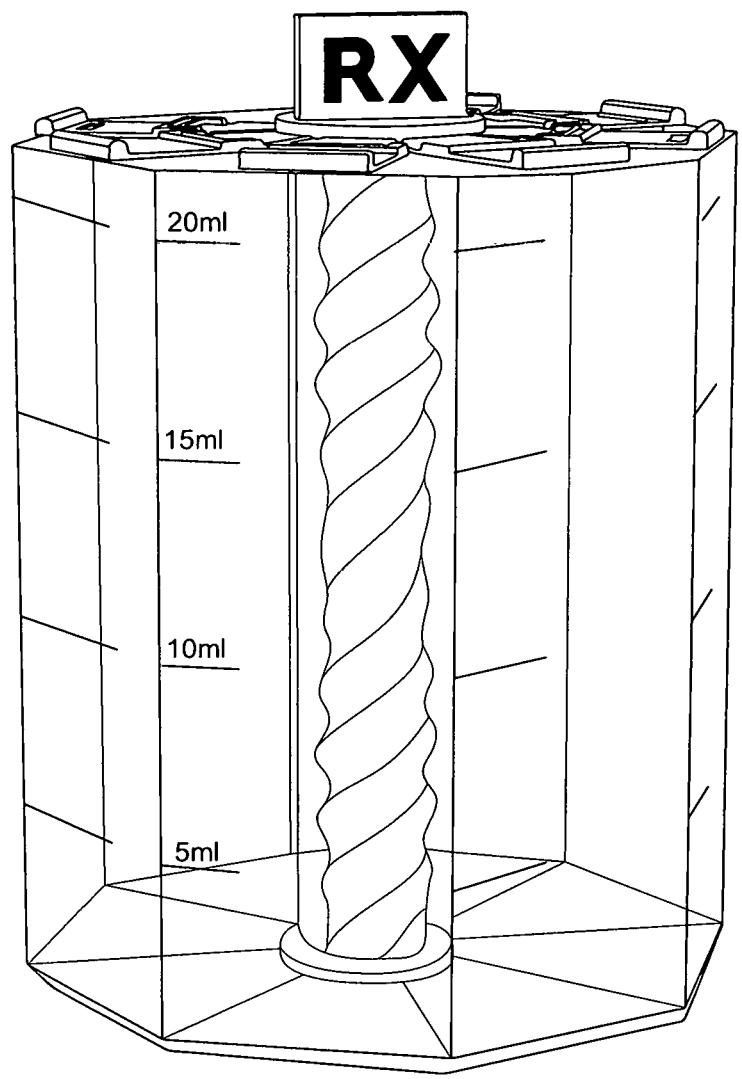
FIG. 2 is a top plan view thereof.
Figure 3:
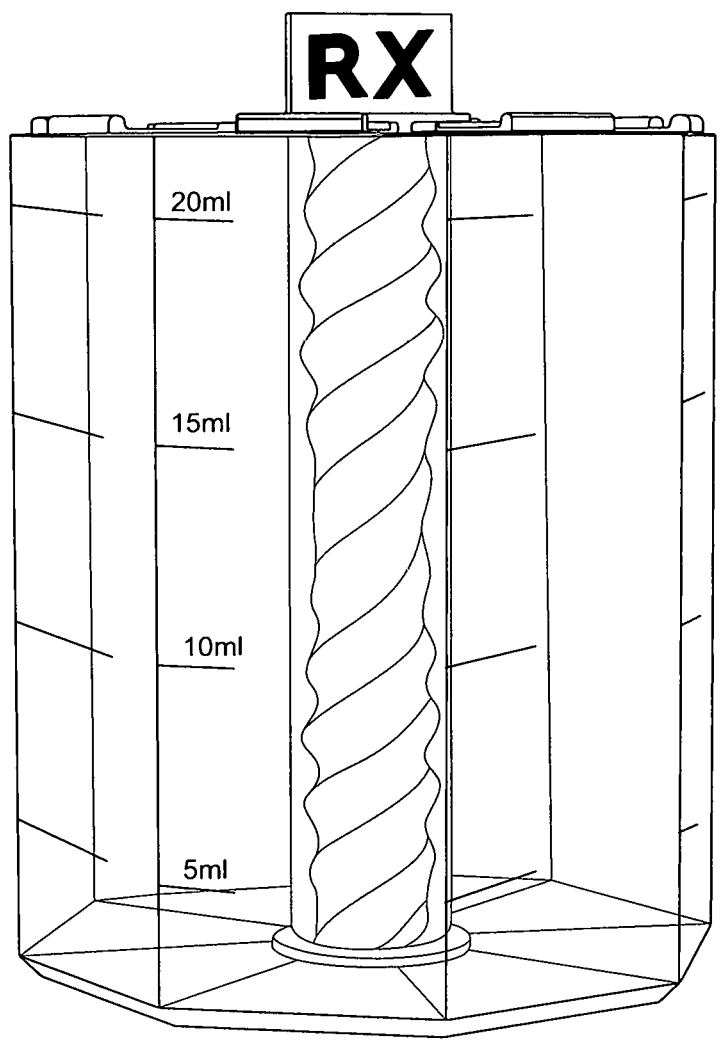
FIG. 3 is a perspective view of a system of liquid medication dispensing according to the preferred embodiment of the present invention utilizing a plurality of individual storage and dispensing devices.
Figure 4:
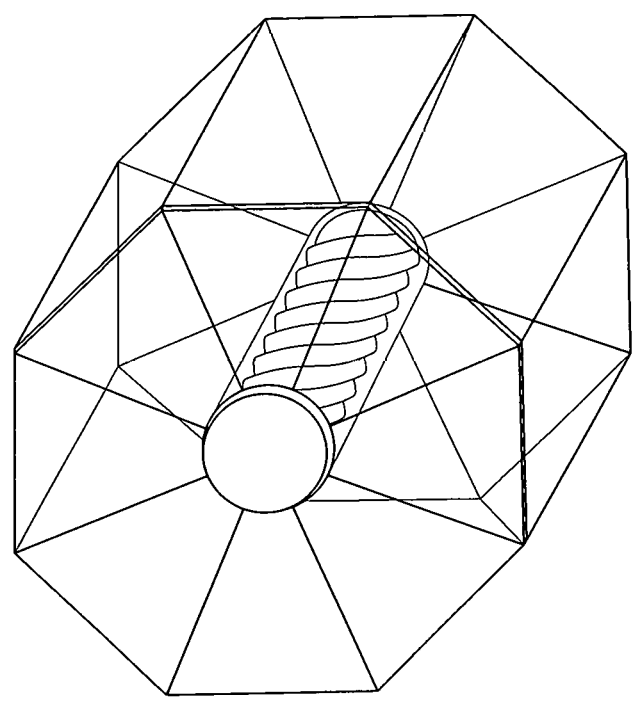
FIG. 4 is a bottom perspective view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a liquid medication storage, dispensing and tracking apparatus, generally noted as 10, is shown according to the preferred embodiment of the present invention. The assembly 10 is each adapted in a generally octagonal housing 12 to provide a liquid storage assembly. Further, it is anticipated that an entire system would include a set of four such assemblies 10, with each one indicated for medication times of Morning, Noon, Evening and Bedtime, respectively. For clarity of description, the detailed embodiment of one such assembly 10 shall be described herein. However, it should be apparent that for use in an entire system of four such assemblies that each such assembly 10 will be similarly structured, with the only discernable difference being separate time of day indicia (i.e., morning, noon, evening, bedtime).

Each octagonal housing 12 forms eight individual compartment, with seven compartments functioning as a container to be opened to be filled with liquid medication. Each compartment can hold 20 ml and is labeled with the day of the week/time of day. The eighth compartment is black and labeled "Time to Refill".

As described in greater detail, a first compartment 14 provides containment for a first dosage. The compartment 14 has a lid 140 that seals an access/egress orifice, and a sidewall 142 is intended to be formed of transparent or translucent material and incorporate a dosage indicia therein. Compartment 14 is intended to provide containment for a first dosage volume of 20 ml. The dosage indicia may include an indicator of the total dosage volume. According to another aspect of the invention, a plurality of dosage indicators may be included to indicate equal fractions of the first dosage volume such as, for example, indicia at 5 ml, 10 ml, 15 ml and 20 ml. The lid 140 includes a day of the week indicia 144 (i.e. "Mon" or "Monday") and a time of day indicia 146 (i.e. "Morning"). As indicated above and would otherwise be apparent to those having ordinary skill in the relevant art in light of the present teachings, the time of day indicia 146 may alternate for each such assembly 10 used in the four-units system. In other words, the time of day indicia 146 would appear as Noon, Evening and Bedtime, respectively.

The second compartment 16 provides containment for a second dosage. The compartment 16 has a lid 146 that seals an access/egress orifice, and a sidewall 162 is intended to be formed of transparent or translucent material and incorporate a dosage indicia therein. Compartment 16 is intended to provide containment for a second dosage volume of 20 ml. The dosage indicia may include an indicator of the total dosage volume. According to another aspect of the invention, a plurality of dosage indicators may be included to indicate equal fractions of the first dosage volume such as, for example, indicia at 5 ml, 10 ml, 15 ml and 20 ml. The lid 160 includes a day of the week indicia 164 (i.e. "Mon" or "Monday") and a time of day indicia 166 (i.e. "Morning"). As indicated above and would otherwise be apparent to those having ordinary skill in the relevant art in light of the present teachings, the time of day indicia 166 may alternate for each such assembly 10 used in the four-units system. In other words, the time of day indicia 166 would appear as Noon, Evening and Bedtime, respectively.

The third compartment 18 provides containment for a third dosage. The compartment 18 has a lid 180 that seals an access/egress orifice, and a sidewall 182 is intended to be formed of transparent or translucent material and incorporate a dosage indicia therein. Compartment 18 is intended to provide containment for a first dosage volume of 20 ml. The dosage indicia may include an indicator of the total dosage volume. According to another aspect of the invention, a plurality of dosage indicators may be included to indicate equal fractions of the first dosage volume such as, for example, indicia at 5 ml, 10 ml, 15 ml and 20 ml. The lid 180 includes a day of the week indicia 184 (i.e. "Mon" or "Monday") and a time of day indicia 186 (i.e. "Morning"). As indicated above and would otherwise be apparent to those having ordinary skill in the relevant art in light of the present teachings, the time of day indicia 186 may alternate for each such assembly 10 used in the four-units system. In other words, the time of day indicia 186 would appear as Noon, Evening and Bedtime, respectively.

The fourth compartment 20 provides containment for a fourth dosage. The compartment 20 has a lid 200 that seals an access/egress orifice, and a sidewall 202 is intended to be formed of transparent or translucent material and incorporate a dosage indicia therein. Compartment 204 is intended to provide containment for a fourth dosage volume of 20 ml. The dosage indicia may include an indicator of the total dosage volume. According to another aspect of the invention, a plurality of dosage indicators may be included to indicate equal fractions of the first dosage volume such as, for example, indicia at 5 ml, 10 ml, 15 ml and 20 ml. The lid 200 includes a day of the week indicia 144 (i.e. "Mon" or "Monday") and a time of day indicia 206 (i.e. "Morning"). As indicated above and would otherwise be apparent to those having ordinary skill in the relevant art in light of the present teachings, the time of day indicia 206 may alternate for each such assembly 10 used in the four-units system. In other words, the time of day indicia 206 would appear as Noon, Evening and Bedtime, respectively.

The fifth compartment 22 provides containment for a fifth dosage. The compartment 22 has a lid 220 that seals an access/egress orifice, and a sidewall 222 is intended to be formed of transparent or translucent material and incorporate a dosage indicia therein. Compartment 22 is intended to provide containment for a first dosage volume of 20 ml. The dosage indicia may include an indicator of the total dosage volume. According to another aspect of the invention, a plurality of dosage indicators may be included to indicate equal fractions of the first dosage volume such as, for example, indicia at 5 ml, 10 ml, 15 ml and 20 ml. The lid 220 includes a day of the week indicia 224 (i.e. "Mon" or "Monday") and a time of day indicia 226 (i.e. "Morning"). As indicated above and would otherwise be apparent to those having ordinary skill in the relevant art in light of the present teachings, the time of day indicia 226 may alternate for each such assembly 10 used in the four-units system. In other words, the time of day indicia 226 would appear as Noon, Evening and Bedtime, respectively.

The sixth compartment 24 provides containment for a sixth dosage. The compartment 24 has a lid 240 that seals an access/egress orifice, and a sidewall 242 is intended to be formed of transparent or translucent material and incorporate a dosage indicia therein. Compartment 24 is intended to provide containment for a sixth dosage volume of 20 ml. The dosage indica may include an indicator of the total dosage volume. According to another aspect of the invention, a plurality of dosage indicators may be included to indicate equal fractions of the sixth dosage volume such as, for example, indicia at 5 ml, 10 ml, 15 ml and 20 ml. The lid 240 includes a day of the week indicia 244 (i.e. "Mon" or "Monday") and a time of day indicia 246 (i.e. "Morning"). As indicated above and would otherwise be apparent to those having ordinary skill in the relevant art in light of the present teachings, the time of day indicia 246 may alternate for each such assembly 10 used in the four-units system. In other words, the time of day indicia 246 would appear as Noon, Evening and Bedtime, respectively.

The seventh compartment 26 provides containment for a seventh dosage. The compartment 26 has a lid 260 that seals an access/egress orifice, and a sidewall 262 is intended to be formed of transparent or translucent material and incorporate a dosage indicia therein. Compartment 26 is intended to provide containment for a seventh dosage volume of 20 ml. The dosage indica may include an indicator of the total dosage volume. According to another aspect of the invention, a plurality of dosage indicators may be included to indicate equal fractions of the seventh dosage volume such as, for example, indicia at 5 ml, 10 ml, 15 ml and 20 ml. The lid 260 includes a day of the week indicia 264 (i.e. "Mon" or "Monday") and a time of day indicia 266 (i.e. "Morning"). As indicated above and would otherwise be apparent to those having ordinary skill in the relevant art in light of the present teachings, the time of day indicia 266 may alternate for each such assembly 10 used in the four-units system. In other words, the time of day indicia 266 would appear as Noon, Evening and Bedtime, respectively.

All seven compartments are adapted to contain liquid each and have a snap lid that seals all of the contents inside. The lids may be easily opened to retrieve the dose. The interior of each contains a soft rubber lining that allows the lid to seal in order to keep any contents from spilling, mixing or leaking.

The eighth compartment provides a "refill" indicia as a reminder in the form of a sign or a passive visual indicium through the use if a color or other visual appearance dissimilar to the remaining compartments.

The octagonal assembly 12 further provides a central connection column 40. The connector 40 affixes each of the separate containers into the completed assembly 10, while allowing them to subsequently separate in order to facilitate cleaning and refilling and reuse.

2. Operation of the Preferred Embodiment

In operation, a system of four separate liquid dosing and dispensing assemblies can be use to organize liquid medications in a manner that can aid patients, their families or caregivers and to monitor medications throughout various times within the medication schedule. The medication is pre-dispensed for storage or transport into seven individual compartments per assembly. Each assembly can then me used to dispense and track medication doses for each day of the week for morning (first assembly), noon (second assembly), evening (third assembly) and bedtime (fourth assembly). The labels on each cap provide a medication reminder for the appropriate dose of dispensed liquids. After a weeks worth of medication has been dispensed, each assembly is empty and contains an eighth section that has design and visual cues to remind the user or caregiver to refill the assemblies. Each assembly can be disconnected for cleaning, and reassembled prior to or after refilling each with the appropriate unit dose of liquid medicaments.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention is defined by the Claims appended hereto and their equivalents. Therefore, the scope of the invention is to be limited only by the following claims.

Having thus described the invention what is claimed as new and desired to be secured by Letters Patent is as follows:

1. A liquid medication storage, dispensing and tracking apparatus comprising:
 an octagonal shaped housing forming eight separable individual compartments arranged in an octagonal configuration, including:
 seven containment compartments each adapted to be filled with a liquid medication dosage of up to 20 ml for subsequent dispensing, each said containment compartment having a transparent sidewall incorporating a plurality of dosage indicators to indicate 5 ml equal fractions of the dosage volume up to 20 ml; and one reminder compartment having a different color or opacity than the containment compartments and comprising a visual reminder indicia labeled "Time to Refill" to provide a reminder to refill liquid medication doses;

wherein the eight compartments are removably connected to allow for cleaning and refilling/reuse.

2. The apparatus of claim 1, wherein each containment compartment further comprises a containment volume of 20 ml.

3. The apparatus of claim 1, wherein said reminder compartment is formed of a different color or opacity than the containment compartments.

4. The apparatus of claim 1, wherein each said containment compartment further comprises:
   a lid that seals an access/egress orifice; and
   the transparent sidewall incorporating the dosage indicators therein.

5. The apparatus of claim 4, wherein each said lid further comprises:
   a day of the week indicia; and
   a time of day indicia.

6. A liquid medication storage, dispensing and tracking apparatus comprising:
   an octagonal shaped housing forming eight separable individual compartments arranged in an octagonal configuration, including:
      seven containment compartments each adapted to be filled with a liquid medication dosage of up to 20 ml for subsequent dispensing, each said containment compartment having a transparent sidewall incorporating a plurality of dosage indicators to indicate 5 ml equal fractions of the dosage volume up to 20 ml; and
      one reminder compartment having a different color than the containment compartments and comprising a visual reminder indicia labeled "Time to Refill" to provide a reminder to refill liquid medication doses;
   wherein the eight compartments are removably connected to allow for cleaning and refilling/reuse.

7. The apparatus of claim 6, wherein each of said plurality of separable individual containment compartments has a sidewall formed of said transparent or translucent material.

8. A liquid medication dispensing system comprising:
   four octagonal shaped housings, each housing forming eight separable individual compartments arranged in an octagonal configuration, including:
      seven containment compartments each adapted to be filled with a liquid medication dosage of up to 20 ml for subsequent dispensing, each said containment compartment having a transparent sidewall incorporating a plurality of dosage indicators to indicate 5 ml equal fractions of the dosage volume up to 20 ml; and
      one reminder compartment having a different color or opacity than the containment compartments and comprising a visual reminder indicia labeled "Time to Refill" to provide a reminder to refill liquid medication doses;
   wherein the eight compartments of each housing are removably connected to allow for cleaning and refilling/reuse;
   wherein each of the four octagonal shaped housings corresponds to a different time of day, the times of day being morning, noon, evening, and bedtime; and wherein each containment compartment includes a lid with both a day of the week indicia and the time of day indicia corresponding to its housing.

9. The liquid medication dispensing system of claim 8, wherein the seven containment compartments of each housing are arranged sequentially according to days of the week, with the reminder compartment positioned between Sunday and Monday.

10. A method of using a liquid medication storage, dispensing and tracking apparatus, the method comprising:
   providing an octagonal shaped housing forming eight separable individual compartments arranged in an octagonal configuration, including seven containment compartments and one reminder compartment;
   filling each of the seven containment compartments with a liquid medication dosage of up to 20 ml;
   visually confirming the dosage amount using dosage indicators on a transparent sidewall of each containment compartment, the dosage indicators indicating 5 ml equal fractions of the dosage volume up to 20 ml;
   dispensing the liquid medication from one containment compartment per day for seven days; identifying when to refill the apparatus based on a visual reminder indicia on the reminder compartment, the reminder compartment having a different color or opacity than the containment compartments and being labeled "Time to Refill"; and
   separating the eight compartments for cleaning and refilling after the seven days of use.

\* \* \* \* \*